(12) United States Patent
van As et al.

(10) Patent No.: US 7,697,944 B2
(45) Date of Patent: Apr. 13, 2010

(54) METHOD AND APPARATUS FOR DISTRIBUTING MESSAGES TO MOBILE RECIPIENTS

(75) Inventors: Nicolaas Theunis Rudie van As, Groningen (NL); Rentje Theodoor Koning, Groningen (NL); Bart-Jan Buijze, Eelde (NL)

(73) Assignee: CVON Innovations Limited, London (GB)

( * ) Notice: Subject to any disclaimer, the term of this patent is extended or adjusted under 35 U.S.C. 154(b) by 694 days.

(21) Appl. No.: 10/557,107

(22) PCT Filed: May 14, 2004

(86) PCT No.: PCT/NL2004/000335
§ 371 (c)(1),
(2), (4) Date: Dec. 29, 2006

(87) PCT Pub. No.: WO2004/102993
PCT Pub. Date: Nov. 25, 2004

(65) Prior Publication Data
US 2007/0121568 A1    May 31, 2007

(30) Foreign Application Priority Data
May 14, 2003    (NL) .................................. 1023423

(51) Int. Cl.
*H04H 20/71* (2008.01)

(52) U.S. Cl. ..................... 455/466; 370/312; 455/414.2

(58) Field of Classification Search .................. 370/328
See application file for complete search history.

(56) References Cited

U.S. PATENT DOCUMENTS

| 5,408,519 A | 4/1995 | Pierce et al. |
| 5,613,213 A | 3/1997 | Naddell et al. |
| 5,978,775 A | 11/1999 | Chen |
| 5,978,833 A | 11/1999 | Pashley et al. |
| 6,023,700 A | 2/2000 | Owens et al. |
| 6,097,942 A | 8/2000 | Laiho |

(Continued)

FOREIGN PATENT DOCUMENTS

DE     199 41 461 A1    3/2001

(Continued)

OTHER PUBLICATIONS

International Search Report.

*Primary Examiner*—Nick Corsaro
*Assistant Examiner*—Munsoon Choo
(74) *Attorney, Agent, or Firm*—Frishauf, Holtz, Goodman & Chick, P.C.; Robert P. Michal (57) ABSTRACT

For processing digital communication traffic in a network comprising a central communication processing structure (402, 403; 502, 503) and a number of separate devices (401, 405; 501, 505) of users designed for communication with the central communication processing structure, each time, a communication coming from one of the separate devices (401; 501) is received which communication is addressed to another of the separate devices (405; 505). It is then checked whether the received communication meets at least one condition applicable to the communication or the sender (401; 501). In reaction to meeting the condition, a message is added to the communication and the communication including the added message is sent to the addressed device (405; 505).

8 Claims, 6 Drawing Sheets

U.S. PATENT DOCUMENTS

| | | |
|---|---|---|
| 6,334,145 B1 | 12/2001 | Adams et al. |
| 6,345,279 B1 | 2/2002 | Li et al. |
| 6,381,465 B1 | 4/2002 | Chern et al. |
| 6,684,249 B1 * | 1/2004 | Frerichs et al. ............. 709/225 |
| 6,920,326 B2 | 7/2005 | Agarwal et al. |
| 7,072,947 B1 | 7/2006 | Knox et al. |
| 7,149,537 B1 | 12/2006 | Kupsh et al. |
| 2002/0077130 A1 | 6/2002 | Owensby |
| 2002/0083411 A1 * | 6/2002 | Bouthors et al. ............. 717/100 |
| 2002/0137507 A1 | 9/2002 | Winkler |
| 2002/0138291 A1 | 9/2002 | Vaidyanathan et al. |
| 2003/0040297 A1 | 2/2003 | Pecen et al. |
| 2003/0040300 A1 | 2/2003 | Bodic et al. |
| 2003/0154300 A1 | 8/2003 | Mostafa |
| 2003/0188017 A1 | 10/2003 | Nomura |
| 2003/0191689 A1 | 10/2003 | Bosarge et al. |
| 2003/0197719 A1 | 10/2003 | Lincke et al. |
| 2004/0043777 A1 | 3/2004 | Brouwer et al. |
| 2004/0054576 A1 | 3/2004 | Kanerva et al. |
| 2004/0136358 A1 | 7/2004 | Hind et al. |
| 2004/0185883 A1 | 9/2004 | Rukman |
| 2004/0192359 A1 | 9/2004 | McRaild et al. |
| 2004/0203761 A1 | 10/2004 | Baba et al. |
| 2004/0203851 A1 | 10/2004 | Vetro et al. |
| 2004/0204133 A1 | 10/2004 | Andrew et al. |
| 2004/0209649 A1 | 10/2004 | Lord |
| 2004/0240649 A1 | 12/2004 | Goel |
| 2004/0259526 A1 | 12/2004 | Goris et al. |
| 2005/0010641 A1 | 1/2005 | Staack |
| 2005/0060425 A1 | 3/2005 | Yeh et al. |
| 2005/0125397 A1 | 6/2005 | Gross et al. |
| 2005/0249216 A1 | 11/2005 | Jones |
| 2005/0289113 A1 | 12/2005 | Bookstaff |
| 2006/0031327 A1 | 2/2006 | Kredo |
| 2006/0095511 A1 | 5/2006 | Munarriz et al. |
| 2006/0123014 A1 | 6/2006 | Ng |
| 2006/0129455 A1 | 6/2006 | Shah |
| 2006/0194595 A1 | 8/2006 | Myllynen et al. |
| 2006/0200460 A1 | 9/2006 | Meyerzon et al. |
| 2006/0200461 A1 | 9/2006 | Lucas et al. |
| 2006/0206586 A1 | 9/2006 | Ling et al. |
| 2006/0276170 A1 | 12/2006 | Radhakrishnan et al. |
| 2006/0276213 A1 | 12/2006 | Gottschalk et al. |
| 2006/0286963 A1 | 12/2006 | Koskinen et al. |
| 2006/0286964 A1 | 12/2006 | Polanski et al. |
| 2006/0288124 A1 | 12/2006 | Kraft et al. |
| 2007/0004333 A1 * | 1/2007 | Kavanti .................... 455/3.06 |
| 2007/0047523 A1 | 3/2007 | Jiang |
| 2007/0072631 A1 | 3/2007 | Mock et al. |
| 2007/0074262 A1 | 3/2007 | Kikkoji et al. |
| 2007/0083602 A1 | 4/2007 | Heggenhougen et al. |
| 2007/0088687 A1 | 4/2007 | Bromm et al. |
| 2007/0088801 A1 | 4/2007 | Levkovitz et al. |
| 2007/0088851 A1 | 4/2007 | Levkovitz et al. |
| 2007/0100805 A1 | 5/2007 | Ramer et al. |
| 2007/0105536 A1 | 5/2007 | Tingo, Jr. |
| 2007/0117571 A1 | 5/2007 | Musial |
| 2007/0149208 A1 | 6/2007 | Syrbe et al. |
| 2008/0004046 A1 | 1/2008 | Mumick et al. |
| 2008/0013537 A1 | 1/2008 | Dewey et al. |
| 2008/0032703 A1 | 2/2008 | Krumm et al. |
| 2008/0070579 A1 | 3/2008 | Kankar et al. |
| 2008/0071875 A1 | 3/2008 | Koff et al. |
| 2008/0082686 A1 | 4/2008 | Schmidt et al. |
| 2008/0243619 A1 | 10/2008 | Sharman et al. |
| 2009/0275315 A1 | 11/2009 | Alston |

FOREIGN PATENT DOCUMENTS

| | | |
|---|---|---|
| DE | 10061984 A1 | 6/2002 |
| EP | 1 073 293 A1 | 1/2001 |
| EP | 1 109 371 A2 | 6/2001 |
| EP | 1 220 132 A2 | 7/2002 |
| EP | 1 239 392 A2 | 9/2002 |
| EP | 1 365 604 A2 | 11/2003 |
| EP | 1 408 705 A1 | 4/2004 |
| EP | 1 455 511 A1 | 9/2004 |
| EP | 1 542 482 A2 | 6/2005 |
| EP | 1 587 332 A1 | 10/2005 |
| EP | 1 615 455 A1 | 1/2006 |
| EP | 1 633 100 A1 | 3/2006 |
| EP | 1 677 475 A1 | 7/2006 |
| GB | 2 369 218 A | 5/2002 |
| GB | 2 406 996 A | 4/2005 |
| GB | 2 414 621 A2 | 11/2005 |
| JP | 2002/140272 | 5/2002 |
| JP | 2007-087138 A | 4/2007 |
| JP | 2007-199821 A | 8/2007 |
| WO | WO 96/24213 | 8/1996 |
| WO | WO 00/44151 A2 | 7/2000 |
| WO | WO 01/22748 A1 | 3/2001 |
| WO | WO 01/31497 A1 | 5/2001 |
| WO | WO 01/52161 A2 | 7/2001 |
| WO | WO 01/57705 A1 | 8/2001 |
| WO | WO 01/58178 A2 | 8/2001 |
| WO | WO 01/65411 A1 | 9/2001 |
| WO | WO 01/69406 A1 | 9/2001 |
| WO | WO 01/71949 A1 | 9/2001 |
| WO | WO 01/72063 A1 | 9/2001 |
| WO | WO 01/91400 A2 | 11/2001 |
| WO | WO 01/93551 A2 | 12/2001 |
| WO | WO 01/97539 A2 | 12/2001 |
| WO | WO 02/31624 A2 | 4/2002 |
| WO | WO 02/054803 A1 | 7/2002 |
| WO | WO 02/54803 A1 * | 7/2002 |
| WO | WO 02/069585 A2 | 9/2002 |
| WO | WO 02/069651 A | 9/2002 |
| WO | WO 02/075574 A1 | 9/2002 |
| WO | WO 02/084895 A1 | 10/2002 |
| WO | WO 03/015430 A1 | 2/2003 |
| WO | WO 03/019845 A2 | 3/2003 |
| WO | WO 03/024136 A1 | 3/2003 |
| WO | WO 03/049461 A2 | 6/2003 |
| WO | WO 03/088690 A1 | 10/2003 |
| WO | WO 2004/084532 A1 | 9/2004 |
| WO | WO 2004/086791 A1 | 10/2004 |
| WO | WO 2004/100470 A1 | 11/2004 |
| WO | WO 2004/100521 A1 | 11/2004 |
| WO | WO 2004/102993 A1 | 11/2004 |
| WO | WO 2004/104867 A2 | 12/2004 |
| WO | WO 2005/029769 A1 | 3/2005 |
| WO | WO 2005/076650 A1 | 8/2005 |
| WO | WO 2006/002869 A1 | 1/2006 |
| WO | WO 2006/005001 A2 | 1/2006 |
| WO | WO 2006/016189 A1 | 2/2006 |
| WO | WO 2006/027407 A1 | 3/2006 |
| WO | WO 2006/040749 A1 | 4/2006 |
| WO | WO 2006/093284 A1 | 9/2006 |
| WO | WO 2006/119481 A2 | 11/2006 |
| WO | WO 2008/013437 A1 | 1/2008 |
| WO | WO 2008/045867 A1 | 4/2008 |
| WO | WO 2008/147919 A1 | 12/2008 |

* cited by examiner

METHOD AND APPARATUS FOR DISTRIBUTING MESSAGES TO MOBILE RECIPIENTS

FIELD AND BACKGROUND OF THE INVENTION

The invention relates to a method and an apparatus for distributing communications to mobile recipients.

Such a method is known from European patent application 1 073 293 and from international patent application WO 01/50793. According to these known methods, mobile, addressable telecommunication devices, according to these examples mobile telephones, are registered in a database and, on the basis of data stored in the database, which determine for the respective devices to what extent advertising messages may be sent to these devices, advertising messages to be distributed are sent to the respective devices.

A drawback of these manners of distributing advertising messages is that they are sent as separate communications, which involves relatively high costs, and the user of the device on which the message has been received needs to separately operate and consult the device in reaction to signaling receipt of a message, to then conclude that the received communication merely contains an advertising message. A further drawback is that the advertising messages can only be distributed to devices of users who are registered, which limits the size of the population of users to whom the advertisement can be sent.

A variant of such a method is described in international patent application WO 01/22748, according to which, by means of a mobile telecommunication device, a request is sent to receive messages, such as route information or information regarding places which are touristically or otherwise important, depending on the occurrence of certain conditions, such as the position of the device, which may, for instance, have been determined by means of an incorporated GPS receiver. Here, it is provided that communications are sent in combination with an advertising message to be distributed if space is present for this. Although this obviates the drawbacks that the advertising messages are separately sent and the user needs to separately operate and consult his device when the advertising message is received, the population of users of mobile devices which can be reached with advertisements is further limited, because they can only be reached if they have requested conditional requests for sending information and if the respective condition which occasions the sending of information occurs.

SUMMARY OF THE INVENTION

It is an object of the invention to provide a solution which makes it possible to brings messages to be distributed, such as advertising messages, to the notice of a larger population of users, while the relatively expensive sending and receiving of separate advertising messages, which involves bother for the recipient, is avoided.

According to the present invention, this object is achieved with a method according to claim 1. For carrying out the method, the invention further provides an apparatus according to claim 8.

Because the messages to be distributed are added to communications coming from devices of users, the possibility is created to add messages with the consent of registered users, which messages, with the communications, can also reach non-registered users, without the users to whom the messages are sent needing to separately operate their device for taking notice of the messages. The communications in which the messages can be included may, for instance, be SMS or MMS communications or communications composed according to another standard.

Special elaborations of the invention are set forth in the dependent claims. Further aspects, effects and details of the invention are described and elucidated on the basis of exemplary embodiments with reference to the drawing.

DETAILED DESCRIPTION

The invention is first of all further elucidated in and by an example, which is based on collecting credits which can be used to send communications from one mobile device to another mobile device for free or at a reduced rate. However, it is also possible that the payment of the sending of the communications takes place in a different manner. Credits may, for instance, be available when buying a product, purchasing a service or taking out a subscription. The credits may, for instance, be issued by means of a scratch card or a code communicated in a different manner and may be registered in relation to the telephone bill of the user, for instance via an Internet Portal where the user has at least filled out his name, address, city/town and mobile telephone number.

After registration, the 'saving account' of the user is kept. This makes it, for instance, possible for the user to send free, or at least sponsored, communications via his own mobile phone. A form of P2P (peer-to-peer) advertising is created. When consumer A then sends a communication to consumer B via his mobile telephone, he can do this for free or at a reduced rate. The sponsor of the communication pays at least a part of the costs of the communication and in exchange, a short commercial message is added to the sent communication.

The commercial message coupled to the communication can be adjusted both with regard to text and layout to, for instance, the days of the week, to particular times of the day and/or to other particularities.

Additional payment by the user of amounts per communication to which a message has been added is also possible: the user registers, chooses, for instance, an idealistic cause, and from that moment, the user and/or a third party pays an extra amount per communication for the benefit of the chosen good cause. The communication is provided with an addition related to the chosen good cause. The user may set an upper limit for his contributions. It is also possible that the added message is a service for which the user pays, such as adding a map on which the momentary position of the device of the sender is shown or laying out the message (optionally with addition of standard details regarding the user).

The user may approach the server via various protocols, such as http, smtp, wap and gprs. Just to be perfectly clear: this is by no means a limitative enumeration of the possibilities.

Here, a distinction is made between the concepts 'communication server' and '(central) system server'. The communication server is a conventional apparatus for the processing of digital communication traffic. On this communication server, each sent communication is temporarily kept for carrying out various checks. Examples of these checks are "billing" (payment between different providers and the users of the separate devices (prepaid or subscriber) registered with the respective communication server). The system server or, optionally, the communication server checks whether the user is registered in the sense that he can make use of the service of addition of sponsored messages or messages to be paid to his communications. By means of the system server, the communication is either sent on unmodified or sent on adjusted, in that a message is added, to the addressed device.

A further possibility to make a distinction between dedicated hardware and software and non-dedicated hardware and software. The device of the user may be designed such that the user who wants to send a communication can make a choice between sending the communication via a conventional ("non-dedicated") communication server and sending it via a communication server designed for adding messages ("dedicated").

If, for instance, an SMS communication is sent with a conventional mobile telephone, this takes place with a preset telephone number of the communication exchange of the provider of the user. By providing an extra option on the mobile telephone, so that, in addition to the standard telephone number of the provider, a second telephone number can be programmed of the "dedicated" communication server, it can be decided to have the adding of the message to the communication take place. The mobile telephone then has, for instance, two keys or menu options: one for conventional communication traffic and one for communication traffic with addition of messages by a third party, whether or not for a fee or at a charge.

In the present context, the non-processing of a communication means that the communication is not sent on to the recipient and that, for instance, the sender receives the communication back or receives an error message stating the reason of non-processing.

Figure 1:
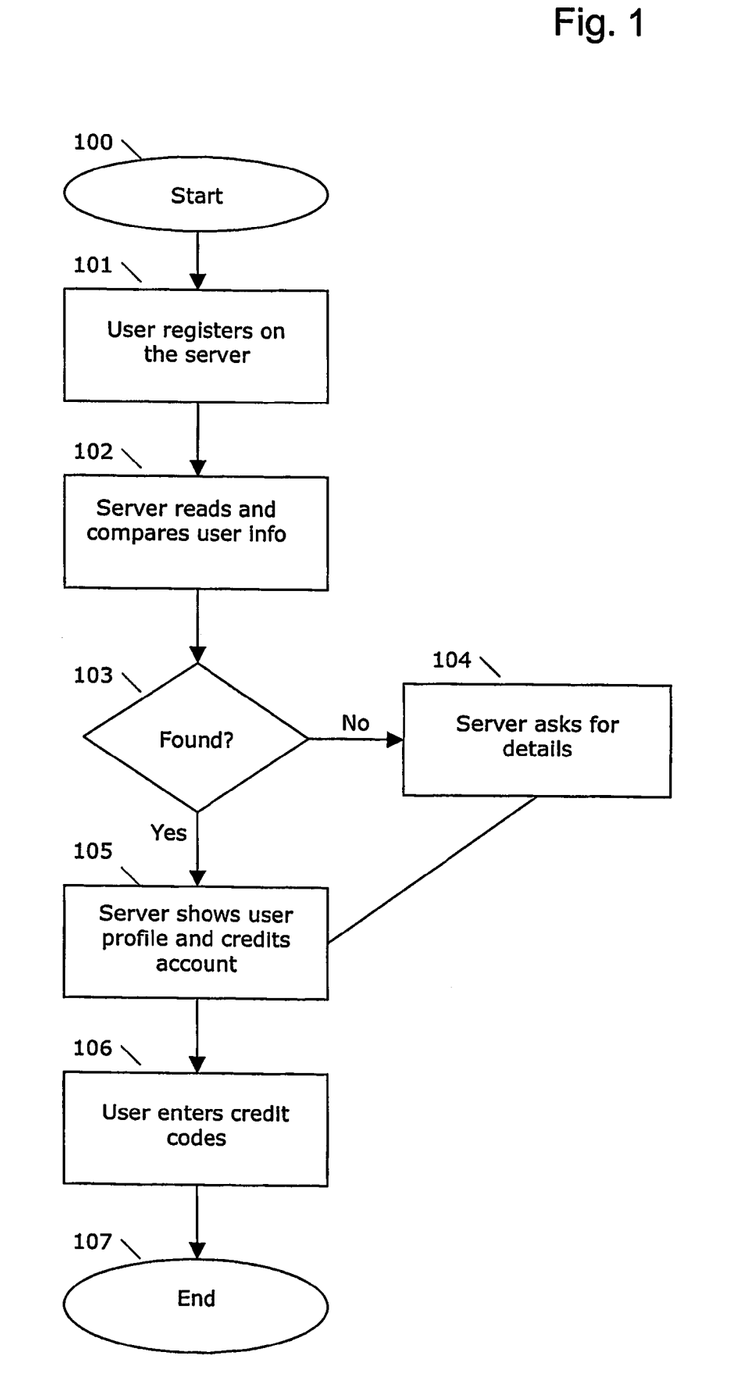
FIG. 1 is a flow chart of a registration procedure and the upgrading of the account with a central system server.

The example shown in FIG. 1 of a procedure for registering and upgrading credits/the account with a central system server starts at 100. Then, the user approaches the system server via an existing protocol and registers (step 101). The system server reads and compares the entered user information (step 102) and then checks whether the user is already known (step 103). If this is not the case, a registration procedure 104 can be followed, in which the server asks the user for details such as user name and password, name, address, city/town, sex, age and (mobile) telephone number(s). When the user has been logged in, the server then shows the user the stored user profile and the number of credits the user has at his disposal (step 105). Step 106 is the upgrading of the credits by means of entering obtained unique codes. Step 107 is the closing of this procedure.

Figure 2:
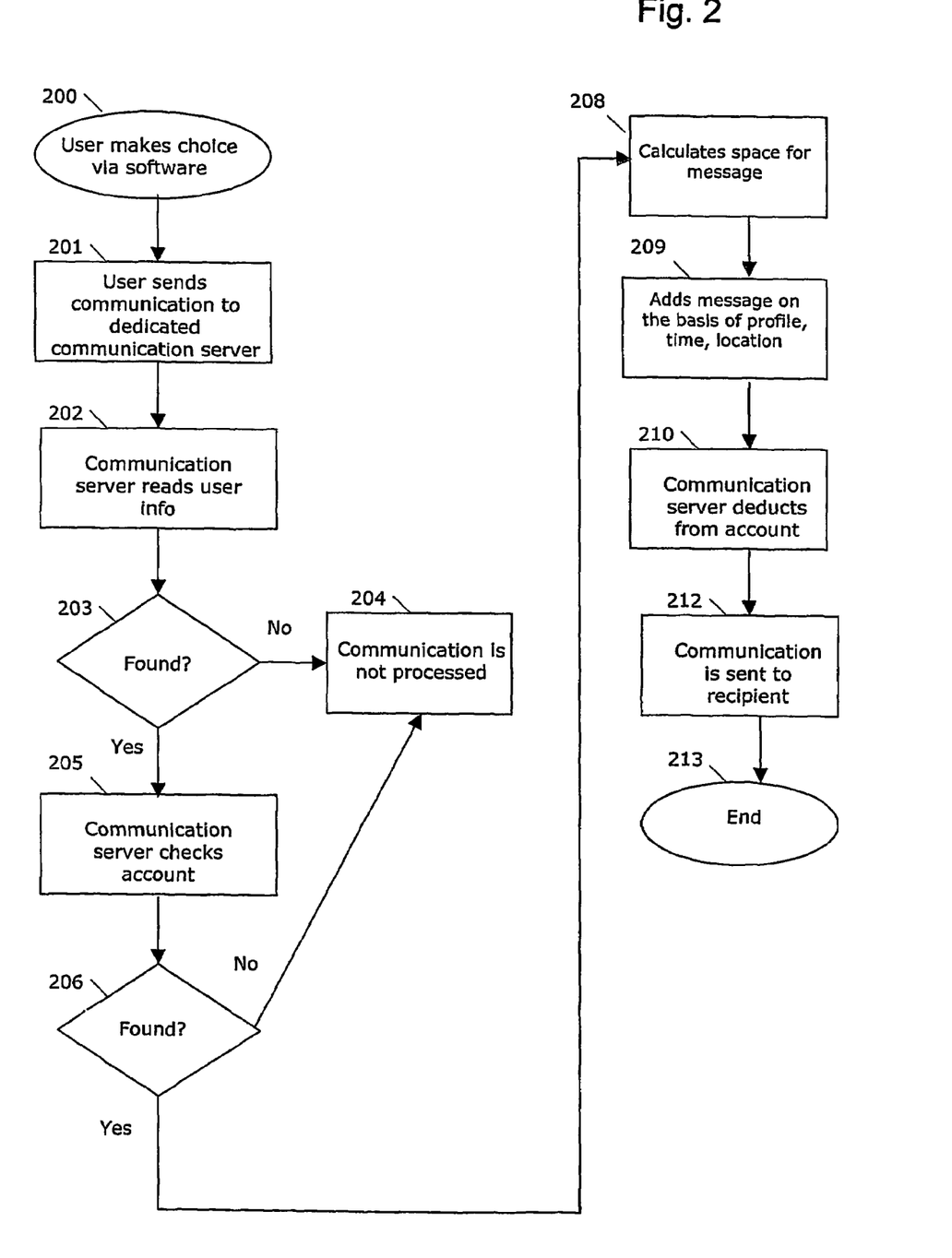
FIG. 2 is a flow chart of the sending of a communication by use of software and/or hardware adapted for application of the invention, the addition of a commercial message and the delivery of the communication to a recipient.

The example shown in FIG. 2 of adding a commercial message to the communication sent by the user starts with the user making, by means of a provision on his device, a choice for sending a communication via a communication server or server structure designed for adding messages ("dedicated") (step 200). In 201, by means of his device, the user sends a communication addressed to a device of a recipient intended by him (peer-to-peer communication). This communication is received by the dedicated communication server (step 202). The dedicated communication server reads user information included in the received communication, checks whether the sender of the communication is registered (step 203), and determines whether the communication is to be accepted. If the sender is not registered as a user of the invention, the communication is not processed and the non-processed procedure is followed (step 204). If the sender is registered, the communication server checks the credits account of the user (step 205). In case of an insufficient account, procedure 204 is again applicable and the message is not processed. If the account is sufficient, the communication server calculates if there is sufficient space for the message to be added. If there is insufficient space, the communication server may (if necessary for the chosen medium) create an extra communication which is coupled to the original communication. As step 206, the communication server then adds a commercial message. This may take place on the basis of various conditions, such as the user profile, the type of credits, the location of the sender and the time of sending. The messages to be added, which, incidentally, may have been automatically dynamically edited depending on conditions, have been laid down in advance by the manager of the server and are stored in a database coupled to the communication server. In other words, there is a limitative number of messages chosen by the manager from which the message to be added can be chosen. Depending on the medium for sending chosen by the user, a message can be chosen which consists of text and/or image and/or sound. The communication server then deducts the used number of credits from the account of the user (step 210) and sends the processed and adjusted communication to the addressed party in a manner which is conventional per se (step 212).

Figure 3:
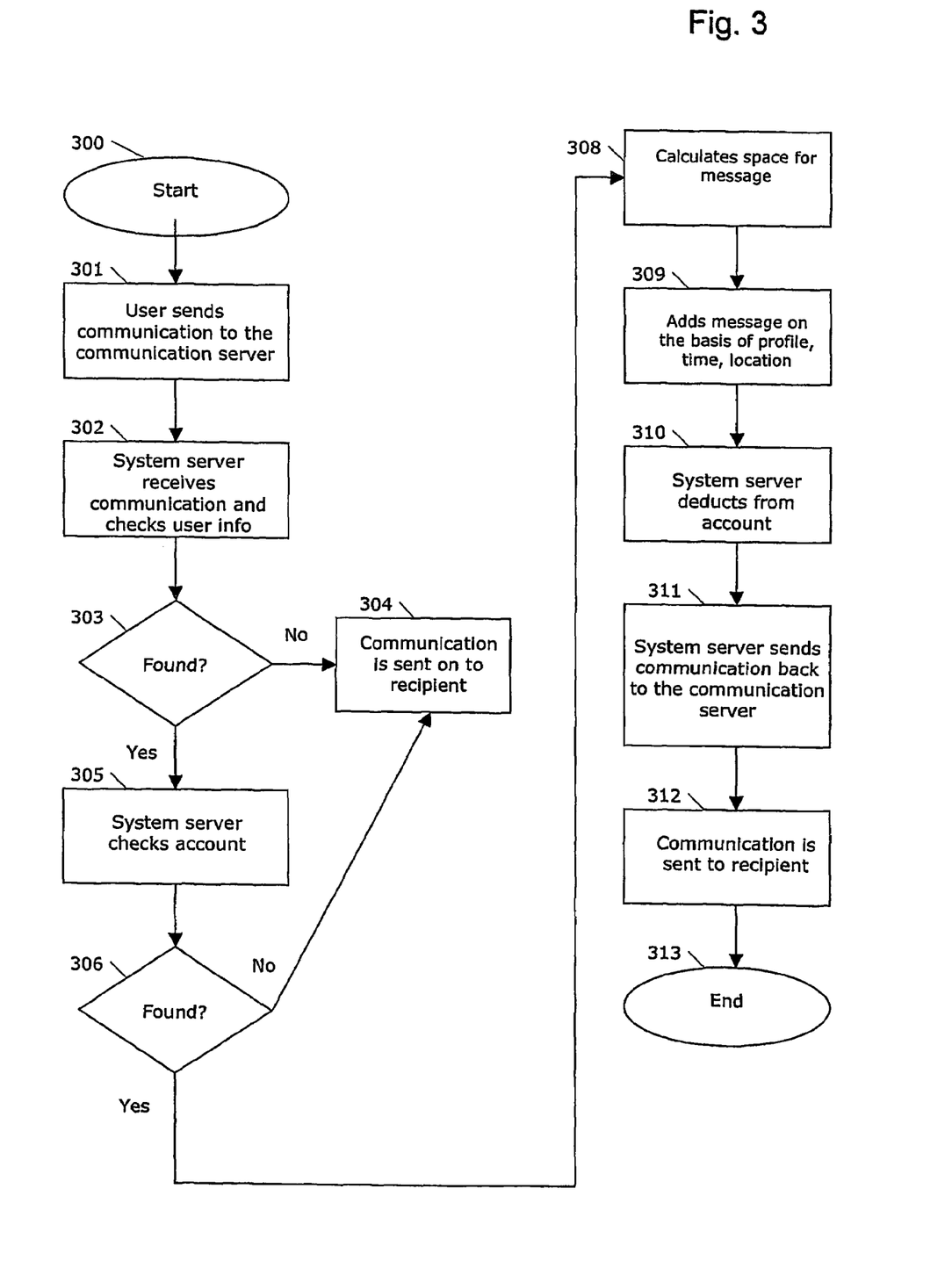
FIG. 3 is a flow chart in accordance with FIG. 2, but it shows the sending of a communication without software or hardware adapted for application of the invention.

The example shown in FIG. 3 of adding a commercial message to the communication sent by the user takes place by directing the message to the addressed party by means of a conventional (non-dedicated) communication server.

Here, the starting (step 300) of the procedure does not comprise the choice for a dedicated communication server, but only the choice for the device function of sending a communication. In 301, the device of the user sends a communication addressed to the recipient intended by him (peer-to-peer communication). The communication also contains a message addition code which indicates that the communication is intended for addition of a message by means of a system server communicating with the communication server. This message addition code may, for instance, be a processing code included at the beginning of the communication, an address (registered as a number which can be chosen at a special rate or for free) or an element in the address. The user himself can choose to send a sponsored SMS communication or one at his own expense by choosing or not choosing the message addition code.

This communication is received by the conventional (non-dedicated) communication server. The communication server recognizes the message addition code and sends the communication to the system server in reaction to this. It is also possible to send all communications of users registered for message addition to the system server and to have the check for presence of a message addition code be carried out by the system server. The system server reads the communication (step 302) and checks whether the sender is registered (step 303). If the sender is not registered as a user, a communication-not-processed procedure 304 is followed and a non-processed communication is sent to the recipient via the communication server. If the sender is registered, the system server checks the credits account of the user (step 305). In case of an insufficient account, the non-processed procedure 304 is again applicable. If the account is sufficient, the system server checks whether there is sufficient space for the commercial message to be added (step 308). If there is insufficient space, the system server may (if necessary for the chosen medium) create an extra communication which is coupled to the original communication for sending it in combination therewith. The system server then adds a message which is selected and optionally automatically edited in a similar manner to the manner described in the above-described example. The system server then deducts the number of used credits from the account of the user (step 310) and sends the processed communication back to the nondedicated communication server (step 311), with the address being the address of his message as indicated by the sender. The communication server then sends the communication to the recipient in the conventional manner (step 312).

Figure 4:
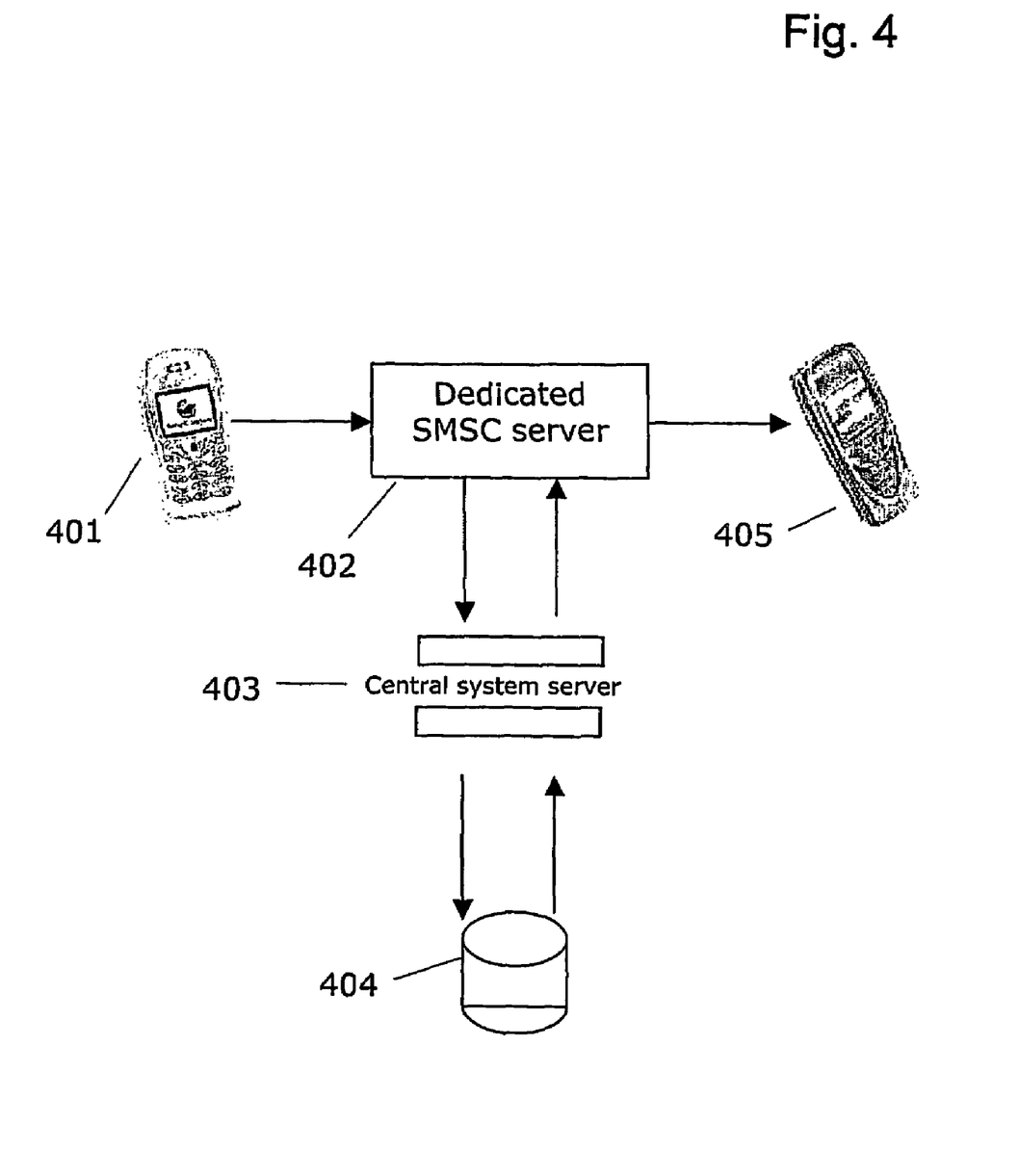
FIGS. 4 and 5 show communication processing structures for application of a method according to FIGS. 3, 4 and 6.

FIG. 4 shows an example of a server structure designed for processing communications basically according to the procedure shown in FIG. 2, where the device 401 of the sender is a mobile telephone designed or at least programmed specially for allowing the addition of messages to communications ("dedicated").

It has been chosen to describe the implementation of the invention in the medium SMS as an example. In this process, the dedicated communication server is referred to as the dedicated SMSC server. Via a preset on his mobile telephone 401 (number of user for instance: 06 11111111), the user sends an SMS communication addressed to the mobile telephone 405 of the recipient chosen by him having, for instance, number 06 22222222. Because the device 401 has chosen the number of a dedicated SMSC server 402 for sending the communication, the SMS communication is directed to this dedicated SMSC server 402. As indicated in FIG. 2, this can carry out the checking and processing of the communications. Unlike what has been described in FIG. 2, it is, however, also possible that the dedicated SMSC server 402 leaves one or more of the steps related to the processing of all received communications to the system server 403 coupled therewith, where the SMS communication is provided with a message in the manner described with reference to FIG. 2, and by means of information obtained from the database 404 coupled to the system server. After this, the processed communication is sent back to the dedicated SMSC server, which then sends the communication on to the recipient 405 in a conventional manner.

Figure 5:
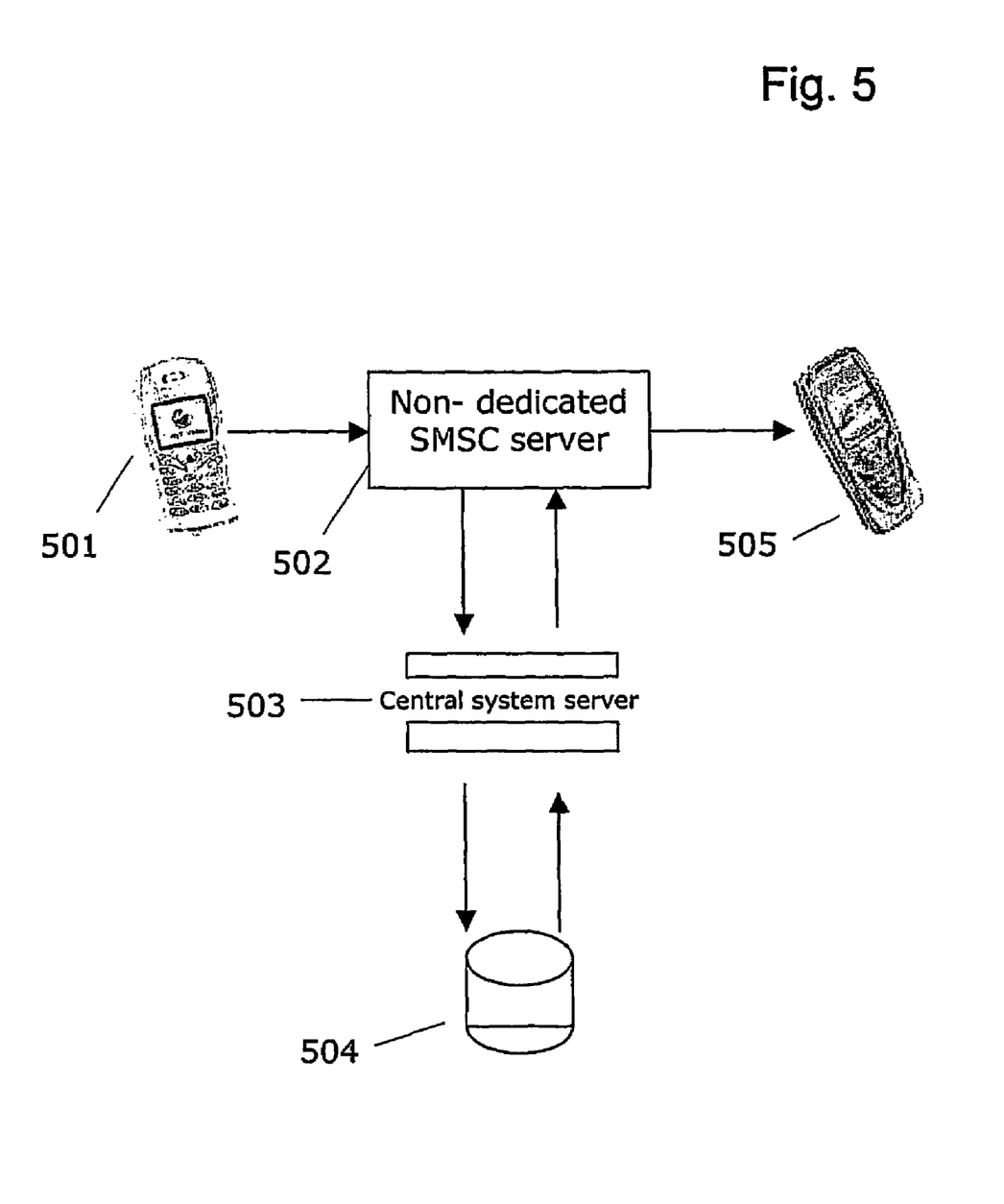

FIG. 5 is an example of a server structure designed for processing communications according to the procedure shown in FIG. 2. Here, the device of the sender is a conventional (non-dedicated) mobile telephone 401 which, each time, sends communications of a particular type, according to this example SMS communications, to a communication server 502 intended for processing both communications to be edited and communications not to be edited ("non-dedicated" communication server).

In this process, the communication server is referred to as the SMSC server 502. From his mobile telephone 501, the user sends an SMS communication addressed to the mobile telephone of the recipient chosen by him. The SMS communication is directed to the SMSC server 502. As described with reference to FIG. 3, the SMS communication is then, exclusively in reaction to a message addition code, directed to the system server 503, where the SMS communication is provided with a message, depending on information obtained from the database 504 coupled to the system server 503. After this, the processed communication is sent back to the SMSC server 502, which then sends the communication to the recipient 505 in a conventional manner.

As a result of the registering, for at least a number of the devices or users, of data related to sent communications and the messages added to them for each device or each user separately, and the recording of data in at least one payment file depending on mutations of data related to sent communications and the messages added to them, the sending of communications can be coupled to an account of the sender with a party which manages the message sending. This makes the addition of messages to communications for a fee or at a charge particularly well manageable. In particular for the relatively expensive sending of communications to and/or from mobile devices, it is advantageous to be able to manage the contributions per user and per communication, for instance depending on expenses of the user with a paying or contributing party. The combined reward for custom and allowing messages makes a, for the user substantial, contribution towards the costs per communication of sending communications possible.

If selecting a message from a number of messages takes place depending on the code included by the user in the received message, the user can influence or determine the choice of the message, for instance taking into account the nature of the communication or the interests of the recipient.

Figure 6:
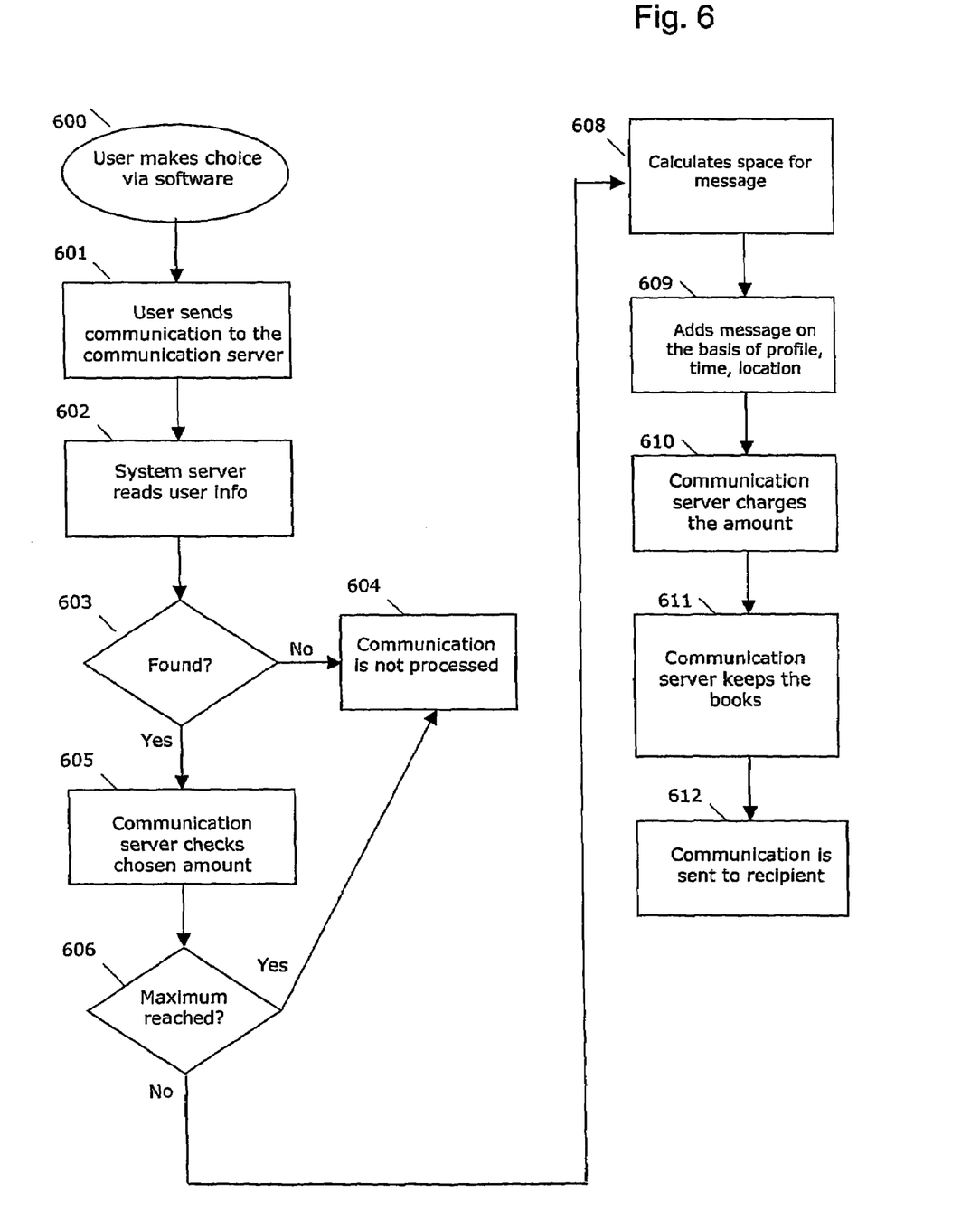
FIG. 6 is a flow chart of the sending of a communication by use of software and/or hardware adapted for application of the invention, the addition of a message, the payment of an amount due for the sending with the added message and the delivery of the communication to a recipient.

FIG. 6 is a further example of a procedure, where a message is added to the communication sent by the user at a charge for the sender.

Steps 600-604 and 608-610 and 612 are similar to steps 200-204 and 208-210 and 212 in FIG. 2. What is different is that, in step 605, the maximum amount is read by the server and, in step 606, it is checked whether the maximum amount chosen in advance by the user has been reached or will be exceeded by processing the communication. If the amount would be exceeded, the non-processed procedure 604 would be put into operation.

The invention claimed is:

1. A method for processing digital communication traffic in a network comprising a central communication processing structure including a communication server and a system server and a number of distributed devices of users designed for communication with the central communication processing structure, comprising:

the communication server receiving a communication coming from one of the distributed devices which communication is addressed to another one of the distributed devices, the communication comprising a header including sender address information and receiver address information, and message content which includes a user inserted code, in reaction to detecting the user inserted code in the message content of the received communication, sending the communication to the system server;

wherein when the user inserted code is not detected, bypassing the system server and sending the communication directly to a recipient device;

the system server checking whether the received communication meets at least one condition applicable to the communication or the sender;

adding a message to the communication based upon the user inserted code included in the communication in reaction to meeting the condition;

sending the communication including the added message to the communication server; and the communication server receiving back the communication from the system server and sending the communication which has been received back to the addressed device.

2. A method according to claim 1, wherein the check comprises: checking whether a coding of the device from which the received communication has been received meets a criterion.

3. A method according to claim 1, wherein the check comprises: selecting a message from a number of messages depending on the result of the check.

4. A method according to claim 3, wherein selecting a message from a number of messages takes place depending on the user inserted code in the received communication.

5. A method according to claim 3, wherein selecting takes place depending on variable data determined upon sending the communication which relate to the sender or the recipient, such as date and/or time and/or location of the sender or the recipient.

6. A method according to claims 3, wherein selecting takes place depending on data stored in advance related to the sender or the recipient.

7. A method according to claim 1, further comprising registering, for at least a number of the devices or users, data related to sent communications and the messages added to them for each device or each user separately, and recording data in at least one payment file depending on mutations of data related to sent communications and the messages added to them.

8. A communication processing structure for processing digital communication traffic in a network, which communication processing structure comprises a communication server and a system server, and is designed for:

communication with a number of distributed devices of users;

wherein the communication server is designed for each time receiving a communication coming from one of the distributed devices, which communication is addressed to another one of the distributed devices, the communication comprising a header including sender address information and receiver address information, and message content which includes a user inserted code, and, each time, in reaction to detecting the user inserted code in the message content of the communication, sending the communication to the system server;

wherein when the user inserted code is not detected, bypassing the system server and sending the communication directly to a recipient's device;

wherein the system server is designed for, each time checking whether the received communication meets at least one condition applicable to the communication or the sender, each time adding a message to the communication based upon the user inserted code included in the communication in reaction to meeting the conditions, and each time sending the communication including the added message to the communication server;

wherein the communication server is designed for, each time receiving back a communication from the system server and for, each time, sending the communications which has been received back from the system server to the addressed device.

* * * * *